United States Patent
Taylor et al.

(10) Patent No.: US 11,261,928 B2
(45) Date of Patent: Mar. 1, 2022

(54) DISC BRAKE

(71) Applicant: Meritor Heavy Vehicle Braking Systems (UK) Limited, Gwent (GB)

(72) Inventors: Martin P. Taylor, Gwent (GB); Gareth Holtham, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 452 days.

(21) Appl. No.: 16/376,012

(22) Filed: Apr. 5, 2019

(65) Prior Publication Data
US 2019/0331184 A1  Oct. 31, 2019

(30) Foreign Application Priority Data
Apr. 30, 2018 (EP) .................................. 18170189

(51) Int. Cl.
| F16D 65/52 | (2006.01) |
| F16D 65/092 | (2006.01) |
| F16D 65/12 | (2006.01) |
| F16D 65/02 | (2006.01) |

(52) U.S. Cl.
CPC ........... *F16D 65/52* (2013.01); *F16D 65/092* (2013.01); *F16D 65/124* (2013.01); *F16D 2065/022* (2013.01)

(58) Field of Classification Search
CPC ...... F16D 65/52; F16D 65/124; F16D 65/092; F16D 2065/022
See application file for complete search history.

(56) References Cited

U.S. PATENT DOCUMENTS

| 6,374,958 | B1 | 4/2002 | Usui et al. | |
| 6,394,248 | B1* | 5/2002 | Monahan | F16D 41/206 |
| | | | | 192/41 S |
| 10,480,602 | B2* | 11/2019 | Sandberg | F16D 65/567 |
| 10,563,718 | B2* | 2/2020 | Sandberg | F16D 65/567 |
| 10,895,297 | B2* | 1/2021 | Taylor | F16D 65/183 |
| 2005/0284709 | A1* | 12/2005 | Sandberg | F16D 65/567 |
| | | | | 188/72.1 |
| 2013/0008749 | A1* | 1/2013 | Sandberg | F16D 65/18 |
| | | | | 188/71.8 |
| 2014/0048358 | A1 | 2/2014 | Jungmann et al. | |
| 2016/0017946 | A1* | 1/2016 | Sandberg | F16D 65/66 |
| | | | | 188/71.8 |

(Continued)

FOREIGN PATENT DOCUMENTS

| CN | 1207798 A | 2/1999 |
| CN | 1388875 A | 1/2003 |

(Continued)

OTHER PUBLICATIONS

Chinese Office Action dated May 6, 2020, for related Chinese Appln. No. 201910348212.1; 9 Pages.

(Continued)

*Primary Examiner* — Vishal R Sahni
(74) *Attorney, Agent, or Firm* — Brooks Kushman PC

(57) ABSTRACT

An actuation mechanism for a disc brake. The actuation mechanism may include a yoke, a piston, a wear adjustment mechanism, and a rolling element bearing. The piston may have a rotatable portion. The wear adjustment mechanism may have a driving portion. The rolling element bearing may be located between the driving portion and the yoke.

19 Claims, 8 Drawing Sheets

(56) References Cited

U.S. PATENT DOCUMENTS

| | | |
|---|---|---|
| 2016/0215841 A1 | 7/2016 | Cleary et al. |
| 2017/0108068 A1* | 4/2017 | Sandberg ................ F16D 65/52 |
| 2019/0024740 A1* | 1/2019 | Taylor ................... F16D 65/567 |
| 2019/0063530 A1* | 2/2019 | Kulkarni ................. F16D 65/52 |
| 2019/0331184 A1* | 10/2019 | Taylor ................. F16D 55/2255 |

FOREIGN PATENT DOCUMENTS

| | | |
|---|---|---|
| CN | 1399709 A | 2/2003 |
| CN | 103727154 A | 4/2014 |
| DE | 102010011725 A1 | 9/2011 |
| JP | H11287267 A | 10/1999 |

OTHER PUBLICATIONS

European Search Report dated Nov. 18, 2019, for related European Appln. No. 19169827.3; 8 Pages.

European Patent Office, Extended European Search Report for European Application No. 18170189.7-1012, dated Nov. 6, 2018.

\* cited by examiner

DISC BRAKE

TECHNICAL FIELD

The present invention relates to a disc brake. More particularly, but not exclusively, the present invention relates to an actuation mechanism for an air actuated disc brake, and a method of assembling a disc brake that includes the actuation mechanism.

BACKGROUND

In many air disc brakes, for use on heavy vehicles such as trucks and buses, to actuate the brake and move brake pads closer to a rotor, a yoke is included, a component that moves axially, to transmit force from an operating shaft of the brake to the piston, when the brake is actuated.

Many of these brakes also include adjustment mechanisms to set the position of the brake pads having friction material relative to the brake rotor, to account for wear of the friction material and the rotor in brake use. The adjustment mechanism often has an input driving portion that is in communication with the operating shaft, so that when the gap between the friction material and the rotor is undesirably large, the operating shaft drives the driving portion, which then transmits a torque to the remainder of the adjustment mechanism, to cause the piston to extend and move the friction material towards the rotor.

However, in use, it can be difficult to ensure that this driving portion of the adjustment mechanism is correctly aligned within the disc brake during installation, and that it remains in this correct alignment during use. Misalignment can result in impairment of the function of the adjuster mechanism.

Also, de-adjustment of the brake can occur, for example due to vibration-induced torques acting on the adjuster mechanism, causing the piston to extend or retract. This is undesirable as it can result in impairment of the brake function due to an excessively large or small pad to rotor air gap.

It would be desirable to reduce the risk of misalignment of the driving portion of the adjuster mechanism and to reduce the risk of vibration-induced torques causing de-adjustment of the disc brake.

SUMMARY

An actuation mechanism for a disc brake is provided. The actuation mechanism comprises: a non-rotatable yoke to transmit an actuating force from an operating shaft; a piston configured to be driven by the yoke to transmit the actuating force to a brake pad, the piston comprising a portion rotatable with respect to the yoke to cause the piston to extend; and a wear adjustment mechanism for adjusting extension of the piston to account for wear of the brake pad, the wear adjustment mechanism including a driving portion configured to be driven by the operating shaft, to transfer torque from the operating shaft to the rotatable portion of the piston to cause the rotatable portion to rotate and extend the piston, wherein a rolling element bearing is located between the driving portion of the adjustment mechanism and the yoke.

As well as helping enable smooth rotation of the driving portion relative to the yoke, the rolling element bearing enables a precise control of friction within the actuation mechanism, helping to ensure that there is sufficient friction where it is needed, and potentially enabling the overall levels of friction to be generated within the wear adjustment mechanism to be reduced, which can, for example allow smaller and lighter components (e.g., a smaller wrap spring) to be used. The rolling element bearing also helps to locate the driving portion radially, helping to prevent misalignment of the driving portion.

The yoke may comprise a generally inboard facing surface that opposes a generally outboard facing surface of the driving portion to define an annulus that locates the rolling element bearing.

The surfaces of the yoke and the driving portion help to ensure accurate location of the rolling element bearing during assembly of the brake.

The rolling element bearing may be a deep-groove ball bearing.

A deep-groove ball bearing is able to accept radial and axial loads, and it has been found that the use of such a bearing within the actuation mechanism increases the controllability of required frictional contact between relevant components of the adjuster mechanism, to help ensure stable performance of the adjustment mechanism during the life of a disc brake and allows the yoke to reliably transit a return force to the piston when the braking load is removed.

The yoke may comprise an inclined surface. Alternatively, the rolling element bearing may be an angular contact ball bearing. The angular contact bearing may have a corresponding inclined surface to engage the inclined surface of the yoke.

An angular contact ball bearing is suitable for use with both radial and axial loads, so it particularly suited for this application. The engagement of the inclined surfaces helps to locate the bearing in the correct location.

An inboard facing surface of the rotatable portion of the piston may engage an opposing outboard facing surface of the yoke such that friction is created between the inboard facing surface of the rotatable portion of piston and the outboard facing surface of yoke, to resist relative rotation of the yoke and the rotatable portion of the piston.

This frictional contact helps to inhibit undesired vibration-induced torque from affecting the adjustment mechanism in operation, and causing undesired de-adjustment of the disc brake.

A resilient element may be arranged to provide a load acting to urge the facing surfaces of the yoke and the piston into contact.

The resilient element thereby generates a predetermined amount of friction between the surfaces so as to further control the undesired de-adjustment. In addition, the load from the resilient element helps maintain the coaxial alignment of the yoke and the piston during adjustment and or return of the piston.

The driving portion may be part of a one-way clutch. The one-way clutch may further comprise a driven portion. Rotation of the yoke in relation to the rotatable portion of the piston may be frictionally resisted with a torque greater than the torque required to cause the one-way clutch to slip, when the actuation force is released at the end of a braking operation.

If the torque exceeds this level, the risk of unwanted de-adjustment is minimized.

One of the driven or driving portions of the one-way clutch may comprise an axially extending projecting portion. The other of the driven or driving portions may be rotatably mounted with respect to the projecting portion.

Beneficially this provides a convenient and compact construction of the one-way clutch.

The resilient element may be arranged to apply a load to the projecting portion, the load being transmitted to the yoke via the rolling element bearing.

This enables the resilient element to be located conveniently within the mechanism.

The resilient element may be further arranged to apply a load to a torque limiting clutch of the adjustment mechanism.

Beneficially, this enables the resilient element to simultaneously perform a further function.

The resilient element may be further arranged to apply a load to the piston in an opposite direction to the load on the yoke.

Beneficially, this enables the resilient element to simultaneously perform a further function.

The adjustment mechanism may further comprise a stop mounted at an outboard end of the projecting portion to take the load from the resilient element. An outboard surface of the stop may be flush with an outboard surface of the projecting portion of the driving portion.

The stop helps to set the level of pre-stress of the resilient element of the adjustment mechanism in the axial direction to help maintain alignment of the components, as well as to retain them. If the outboard surface of the stop is flush with the outboard surface of the projecting portion of the driving portion, it helps to ensure that the stop is mounted in the correct location during assembly of the adjustment mechanism.

A second rolling element bearing may be located on a transmission path between the resilient element and the projecting portion, preferably wherein the first and second rolling element bearings are identical.

This rotationally isolates the resilient element from the projecting portion such that it does not influence the adjuster function in an unwanted manner. If the first and second bearings are identical, this minimizes the parts inventory required to manufacture and service the mechanism.

The driving portion may be a drive drum. The driven portion may be a driven drum in communication with a wrap spring arranged to overlie and bridge the drive drum and driven drum. During an adjustment operation, the drive drum may be directly engaged by a link member that is connected to, or integral with, the operating shaft.

Advantageously, the rolling element bearing arrangement within the actuation mechanism enables the length of the wrap spring to be minimized.

The friction clutch may comprise one or more input plates and one or more output plates arranged in a face-contacting relationship. The output plates may be located within the rotatable portion to directly drivingly engage the rotatable portion.

The driven portion, the friction clutch and the clutch spring may be mounted on the projecting portion of the driving portion. The stop may have a bore. The stop may be mounted on the projecting portion of the driving portion.

The piston may further comprise an outer portion restrained from rotating. The outer portion may be in threaded engagement with the rotatable portion.

The yoke may comprise a sleeve portion projecting in an axially outboard direction. The rolling element bearing may be located between a circumferential surface of the sleeve portion of the yoke and a circumferential surface of the driving portion. The sleeve portion may be monolithically and integrally formed with the yoke.

The rolling element bearing is located between a radially inner surface of the sleeve portion of the yoke and a radially outer surface of the driving portion.

The adjustment mechanism may further comprise an annular spacer element located on the projecting portion of the driving portion, between an outboard facing surface of the driven portion and an inboard facing surface of the sleeve portion of the stop. An air gap may be defined between the spacer element and the driving portion. Alternatively, an air gap may be defined between the spacer element and the sleeve portion of the stop.

The spacer element helps to ensure the components of the adjuster mechanism are generally located in the correct position, but allows for some axial play, to account for expansion or contraction of the components of the brake in use.

The outboard facing surface of the yoke and the inboard facing surface of the rotatable portion of the piston may have different hardnesses. The outboard facing surface of the yoke or the inboard facing surface of the rotatable portion of the piston may be hardened during manufacture.

It has been found that by having engaging surfaces of different hardnesses, e.g., by hardening one of the two engaging surfaces using any suitable process, fretting corrosion can be significantly reduced.

A method of assembling a disc brake is also provided, comprising the steps of: installing an actuation mechanism within the disc brake, the actuation mechanism including: a non-rotatable yoke to transmit an actuating force from an operating shaft; a piston configured to be driven by the yoke to transmit the actuating force to a brake pad, the piston comprising a portion rotatable with respect to the yoke to cause the piston to extend; and a wear adjustment mechanism for adjusting extension of the piston to account for wear of the brake pad, the wear adjustment mechanism including a driving portion configured to be driven by the operating shaft, to transfer force from the operating shaft to the rotatable portion of the piston to cause the rotatable portion to rotate and extend the piston, wherein the method comprises the step of locating a rolling element bearing between the driving portion of the adjustment mechanism and the yoke.

A disc brake is also provided. The disc brake comprises the actuation mechanism of any of the above statements.

An adjuster system is also provided. The adjuster system comprises: a piston for applying an actuating force to a brake pad and being extensible to adjust the running clearance between a brake disc and the brake pad; a chamber; and a wear adjustment mechanism located within the chamber, for adjusting the extension of the piston, wherein the chamber is configured to contain lubricant for lubrication of at least part of the wear adjustment mechanism, and inhibit lubricant from migrating away from the at least part of the wear adjustment mechanism.

As the lubricant is inhibited from escaping from a defined location, it is restricted from migrating to other areas of the disc brake, reducing wear of the components of the adjustment mechanism, and extending the life of a disc brake comprising this adjuster system. If the lubricant is grease or a lubricating oil, a higher quantity of lubricant can be maintained near the parts of the wear adjustment mechanism needing lubrication, such as the wrap spring and/or friction clutch plates. Thus, should there be a degradation or escape of the lubricant over time, a greater amount of lubricant will nevertheless remain in contact with the parts requiring lubrication.

The adjuster system may further comprise a stop mounted at an outboard end of the chamber to take the load from a resilient element of the adjuster mechanism. A sealing member may be arranged between the stop and a radially inner surface of the piston, to inhibit lubricant from migrating in an outboard direction at the outboard end of the piston.

The arrangement of the adjuster system allows a sealing member to be arranged between the stop and a radially inner surface of the piston to inhibit fluid migration at the outboard end in a simple way to inhibit fluid migration.

BRIEF DESCRIPTION OF THE DRAWINGS

Embodiments of the present invention will now be described, by way of example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
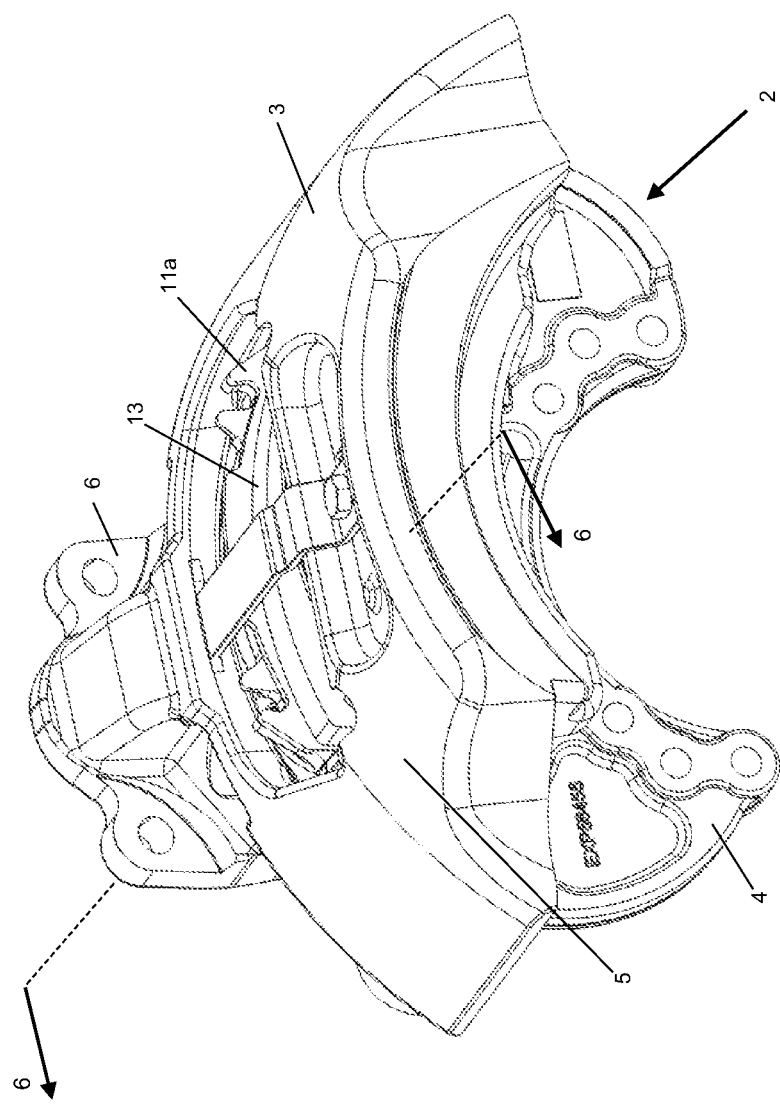
FIG. 1 is an isometric view of a brake including inboard and outboard brake pads, according to an embodiment of the present invention.
Figure 2:
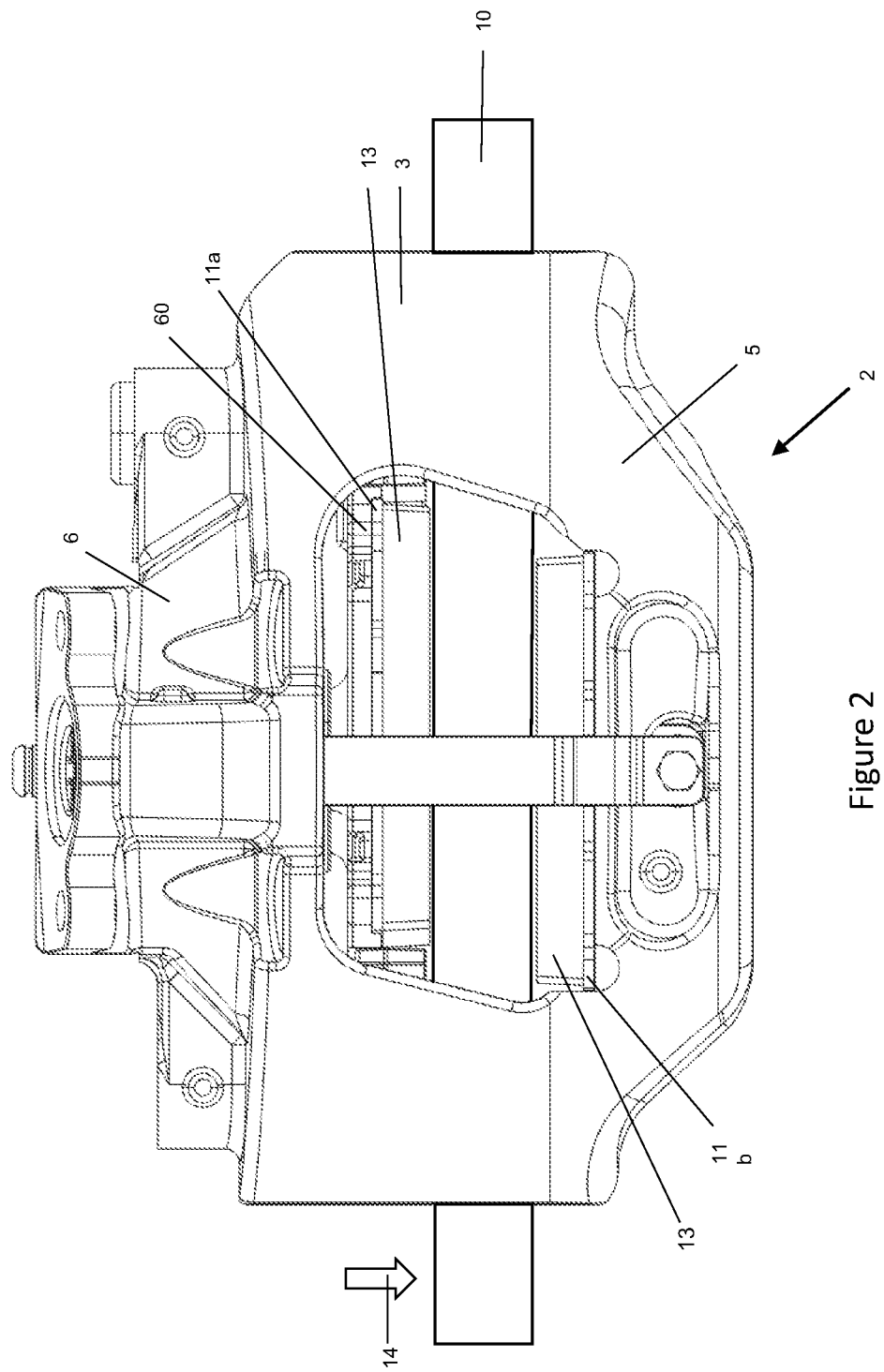
FIG. 2 is a plan view of the brake of FIG. 1, with a brake rotor in situ.
Figure 3:
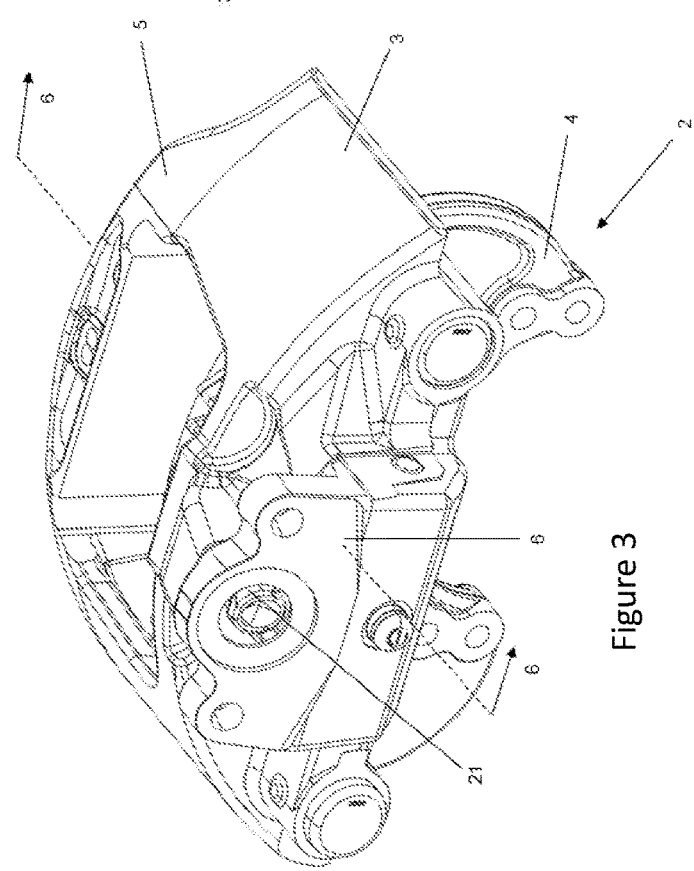
FIG. 3 is an isometric view of the brake of FIG. 1 from an inboard direction, with the inboard and outboard brake pads omitted for clarity.

FIGS. 1, 2 and 3 illustrate a disc brake 2 of the present invention. The disc brake incorporates an actuating mechanism comprising a single piston suitable for a commercial vehicle. This type of brake is particularly, but not exclusively, suitable for lighter duty heavy vehicles, for example smaller trucks, or a trailer of a tractor-trailer combination.

Various orientations of the disc brake are described. In particular the directions inboard and outboard refer to the typical orientation of the disc brake when fitted to a vehicle. In this orientation the brake pad closest to the center of the vehicle is the pad directly actuated by an actuation mechanism and being the inboard pad, and the outboard pad being one mounted to a bridge portion of the caliper. Thus, inboard can be equated with an actuating side of the disc brake, and outboard with a reaction side. The terms radial, circumferential, tangential and chordal describe orientations with respect to the brake rotor. The terms vertical and horizontal describe orientations with the disc brake mounted uppermost on an axle, whereas it will be appreciated that in use such a disc brake may adopt any axle orientation depending upon packaging requirements of the vehicle.

The disc brake 2 comprises a caliper 3 having a housing 6 to accommodate the actuation mechanism and which is slideably mounted on a carrier 4 for movement in an inboard-outboard direction.

Figure 4:
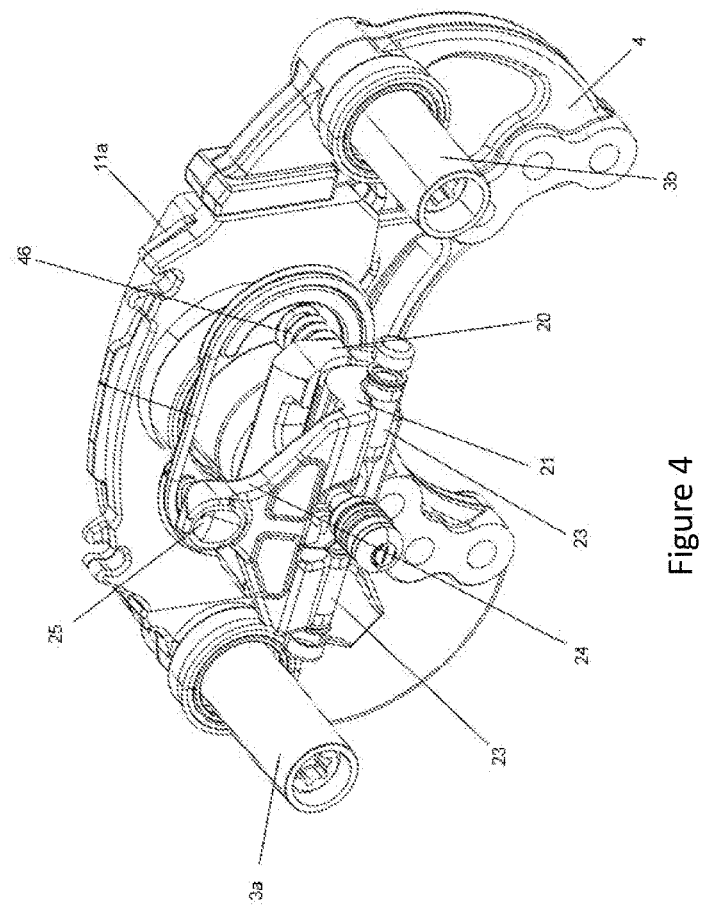
FIG. 4 is an isometric view of the brake of FIG. 1 from an inboard direction, with the outboard brake pad and a caliper housing of the brake omitted for clarity.

As can be seen from the view in FIG. 4 with the housing 6 omitted, the caliper 3 can slide on the carrier 4, by way of first and second guide pins 3a, 3b. In this embodiment, the first guide pin 3a is longer than the second guide pin 3b.

An inboard brake pad 11a comprises a layer of friction material 13 and is arranged so that the friction material 13 faces a brake rotor 10 (also known as a brake disc). The inboard pad 11a is mounted to a brake pad support arrangement. In this embodiment, the inboard brake pad support arrangement is a spreader plate 60, described in more detail below. The pad 11a is moveable in the direction of arrow 14 (see FIG. 2) against the brake rotor 10 (example of rotor shown schematically in FIG. 2).

An outboard pad 11b, also with a layer of friction material 13, is also provided. The outboard pad 11b is mounted to a further brake support arrangement. Suitable means are provided to urge an outboard brake pad 11b against the opposite side of the rotor 10. In this embodiment, such means comprises a bridge 5 arranged so as to straddle the rotor 10 and to transmit the reaction force from an inboard operating shaft 21 to the outboard pad 11b. In this embodiment the housing 6 and bridge 5 are manufactured as a single monolithic casting, but in other embodiments, the bridge may be bolted or otherwise secured to the housing. In this embodiment, the inboard and outboard brake pads 11a, 11b are mounted asymmetrically across an axis parallel to the brake rotor 10. The inboard pad 11a is mounted in a position that is laterally offset from the actuation mechanism, i.e., the line of action of the actuation mechanism does not pass through the mid-point of the inboard pad in a circumferential direction. The outboard pad 11b is mounted directly opposite the actuation mechanism, i.e., it is not laterally offset; the line of action of the actuation mechanism does pass through the mid-point of the outboard pad 11b in a circumferential direction when the pad 11b is mounted. In other embodiments the inboard and outboard brake pads 11a and 11b may not be laterally offset—i.e., may be aligned—or may be offset in another way.

Figure 5:
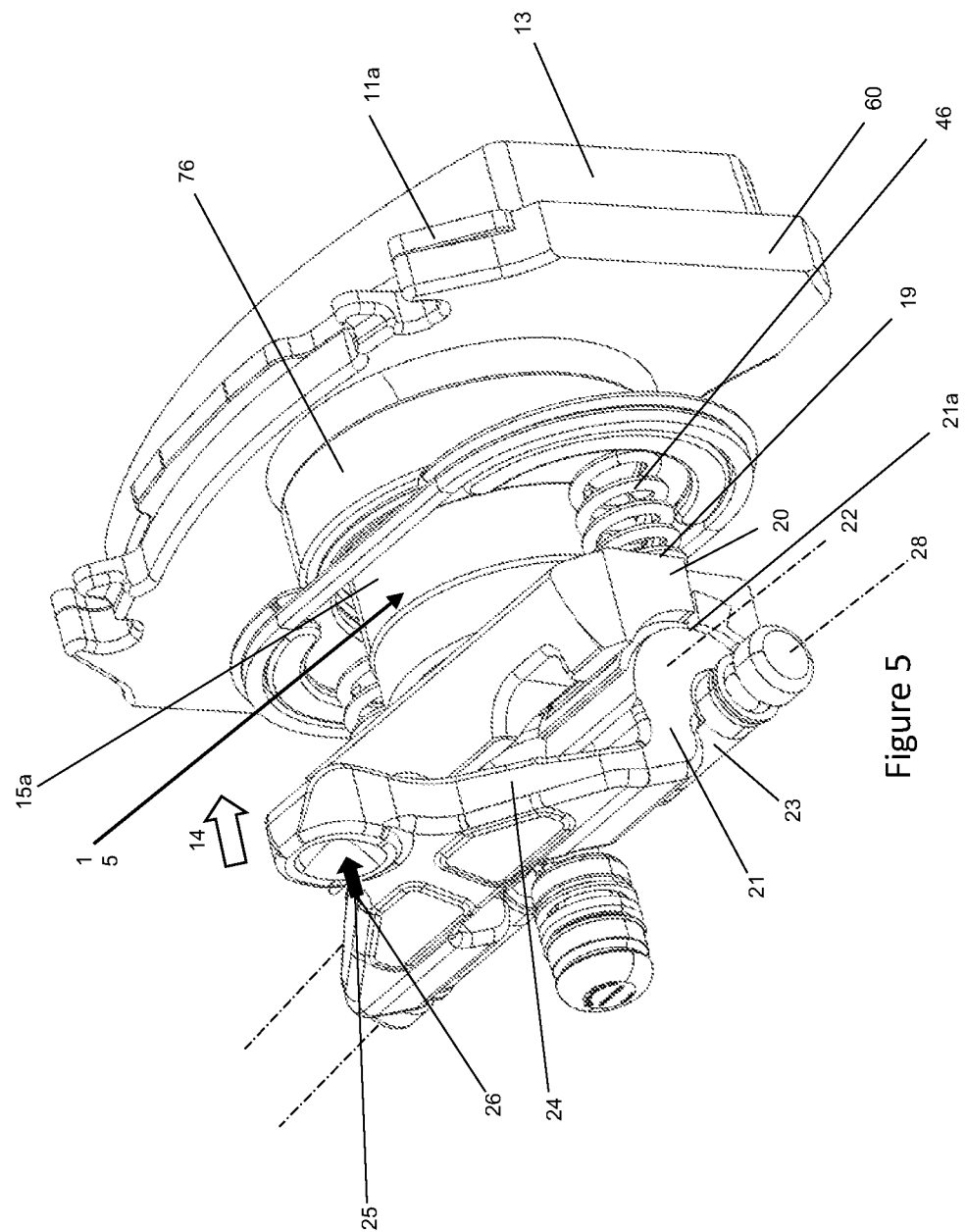
FIG. 5 is an isometric view showing an adjuster arrangement of the brake of FIG. 1, with the inboard brake pad included.
Figure 6:
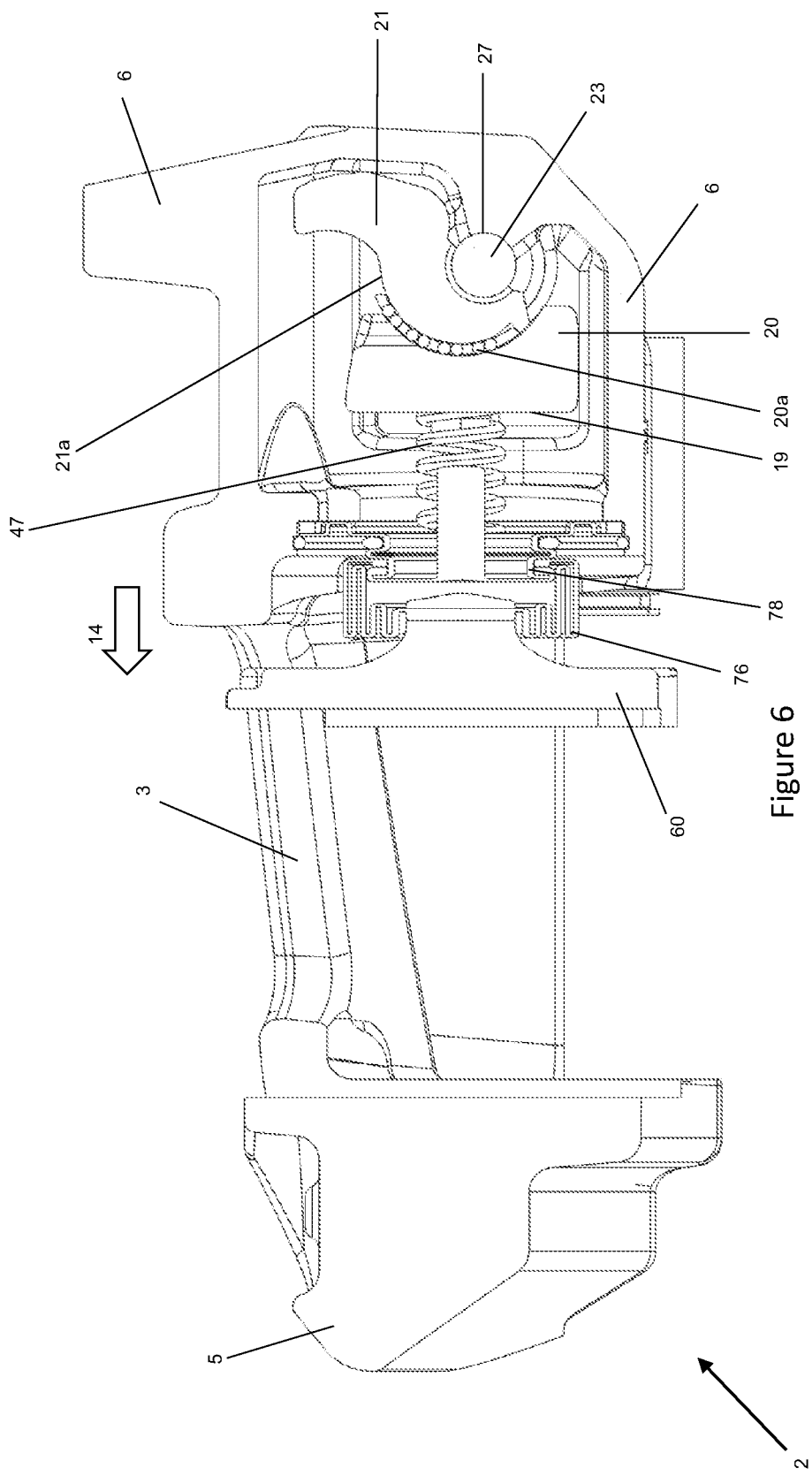
FIG. 6 is a cross-sectional view through an inboard-outboard radial plane 6-6 of the brake of FIG. 1, with no brake pads or carrier included.

With reference to the cut-away view of FIG. 5 and cross-section of FIG. 6 in particular, the inboard actuation mechanism comprises a single brake piston 15 (not shown on FIG. 6 for clarity), slideable in the direction of arrow 14 (i.e., inboard-outboard) relative to the rotor 10 (not shown in FIG. 5, for clarity).

In order to urge the piston assembly in the direction of arrow 14, the operating shaft 21 is pivoted about rollers 23 which are located along a transverse axis 28. In this embodiment, there are two rollers 23, which are spaced from one another laterally. Each roller 23 is located on a single bearing surface 27, each surface 27 being curved to accept the roller 23. Convex surfaces 21a of the operating shaft 21 are located opposite the roller 23. The operating shaft has an axis 22, being the radial center of the arc defined by surfaces 21a, which is parallel and offset from the axis 28. The curved surface 21a locates in a semi-circular recess of a yoke 20. A surface 19 of the yoke 20 opposite the recess is in contact with an inboard end face of the piston 15. The operating shaft 21 further comprises a lever 24 having a pocket 25 adapted to receive an output push rod (not shown) of a brake actuator (e.g., an air chamber). The lever 24 is, in this embodiment, shaped as an inverted "U" (see FIGS. 4 and 10 in particular) and the line of action of the brake actuator (from pocket 25) is substantially over the line of action of the piston 15.

Located between the curved surface 21a and the recess of the yoke 20, on either arm of the 'U' are needle roller bearings 20a, to enable the operating shaft 21 to pivot around the roller 23, in the recess of the yoke 20.

In other embodiments, another form of cam surface instead of the curved surface 21a of the operating shaft 21 may be employed (e.g., a plain bearing) and/or the arrangement may be reversed with the rollers 23 being in contact with the yoke 20, and the curved surface 21a being located in the recess of the caliper housing 6.

The yoke 20 further includes a sleeve portion 40, which projects axially outboard from the yoke 20. The yoke 20 has a through bore extending axially through its center, the bore also extending through the center of the sleeve portion 40. The diameter of the bore at the sleeve portion 40 is lower than the diameter of bore for the remainder of the yoke, such that an internal shoulder 40a is defined between the sleeve portion 40 and the remainder of the yoke 20. The shoulder 40a defines an annular surface that faces in an inboard direction.

In this embodiment, the sleeve portion 40 and yoke 20 are made from a single piece of material, i.e., they are integrally and monolithically formed, but in alternative embodiments the sleeve portion 40 and yoke 20 are separate components that are fixed together during assembly, in any suitable way.

Application of a force in the direction of arrow 26 (FIG. 5) causes pivoting movement of the operating shaft 21 about the rollers 23 and the curved surface 21a bears on the yoke 20. The offset axes 28 and 22 cause the yoke 20 to move in the direction of the piston 15, contacting the piston 15 and causing the piston 15 to urge the friction material 13 of the brake pad 11a directly against the rotor 10. A reaction force from the operating shaft 21 is transmitted to the bearing surface 27 of the caliper 3 via the rollers 23 and is then transmitted to the outboard pad 11b via the bridge 5, with the friction material 13 of the outboard pad 11b being urged against the rotor 10, such that the pads 11a and 11b clamp the rotor and effect braking through a frictional brake force. In this embodiment, it should be noted that the piston is not itself directly guided with the caliper. Rather, at the outboard end the position of the piston transverse its line of action is determined by interaction of a spreader plate with the brake carrier.

A wear adjuster mechanism 30 to maintain a desired running clearance between the rotor 10 and pad 11a, 11b is described below. Generally, the operating shaft 21 is connected to a one-way clutch to transfer any rotation of the operating shaft beyond a predetermined degree. Between the one-way clutch and operating shaft are a link member, which is driven by the operating shaft and drives the one-way clutch. The one-way clutch has a driving portion configured to rotate if the link member rotates, and a driven portion mounted on the driving portion, that is driven by the driving portion. In this embodiment, the driving portion is a drive drum 35 with the driven portion being a driven drum 37. The link member is a pin that projects axially outboard from the operating shaft 21. The pin is in communication with a corresponding slot in the drive drum 35, the slot being at a position offset from the longitudinal axis of the drive drum 35 (which is aligned with the axis passing through the center of the rotor of the brake), such that as the operating shaft pivots in use, the pin engages within the slot to cause the drive drum 35 to rotate (see FIG. 7 for the slot within the drive drum). In an alternative embodiment, the slot is located on the operating shaft 21, and the pin on the drive drum 35. In a further alternative, a gear arrangement could be used to ensure the operating shaft 21 is in driving communication with the drive drum 35.

The drive drum 35 is made up of a collar portion 35a at its inboard end and an axially extending projecting portion 35b. In this embodiment, the projecting portion is of a smaller diameter than the collar portion 35a, and extends outboard from the collar portion 35a, concentric with the piston 15. In other words, the projection portion is generally 'finger' shaped. In this embodiment, located adjacent and outboard of the collar portion 35a of the drive drum 35, and concentric radially outward from the finger portion 35b of the drive drum 35, is a driven drum 37.

The driven drum 37 acts as the driven portion of the one-way clutch and is mounted on the drive drum 35. The driven drum 37 comprises a plurality of axially extending recesses 38 which are arranged to accommodate corresponding lugs projecting radially inwardly from input plates 41a of a friction clutch 41. In other embodiments alternative arrangements for driving the clutch input plates are contemplated e.g., a different number of recesses, or projections rather than recesses.

A wrap spring 39 is frictionally wrapped around outer circumferential surfaces of the collar portion 35a of the drive drum 35 and the driven drum 37, such that it bridges the two components and enables the two components to act as a one-way clutch. The wrap spring 39 can easily bridge the two components, as they are both cylindrical and have the same outer diameter at the location point where the wrap spring 39 engages. In other embodiments other suitable one-way clutches may be utilized, such as ball and ramp, or roller clutch/sprag clutch arrangements.

Figure 7:
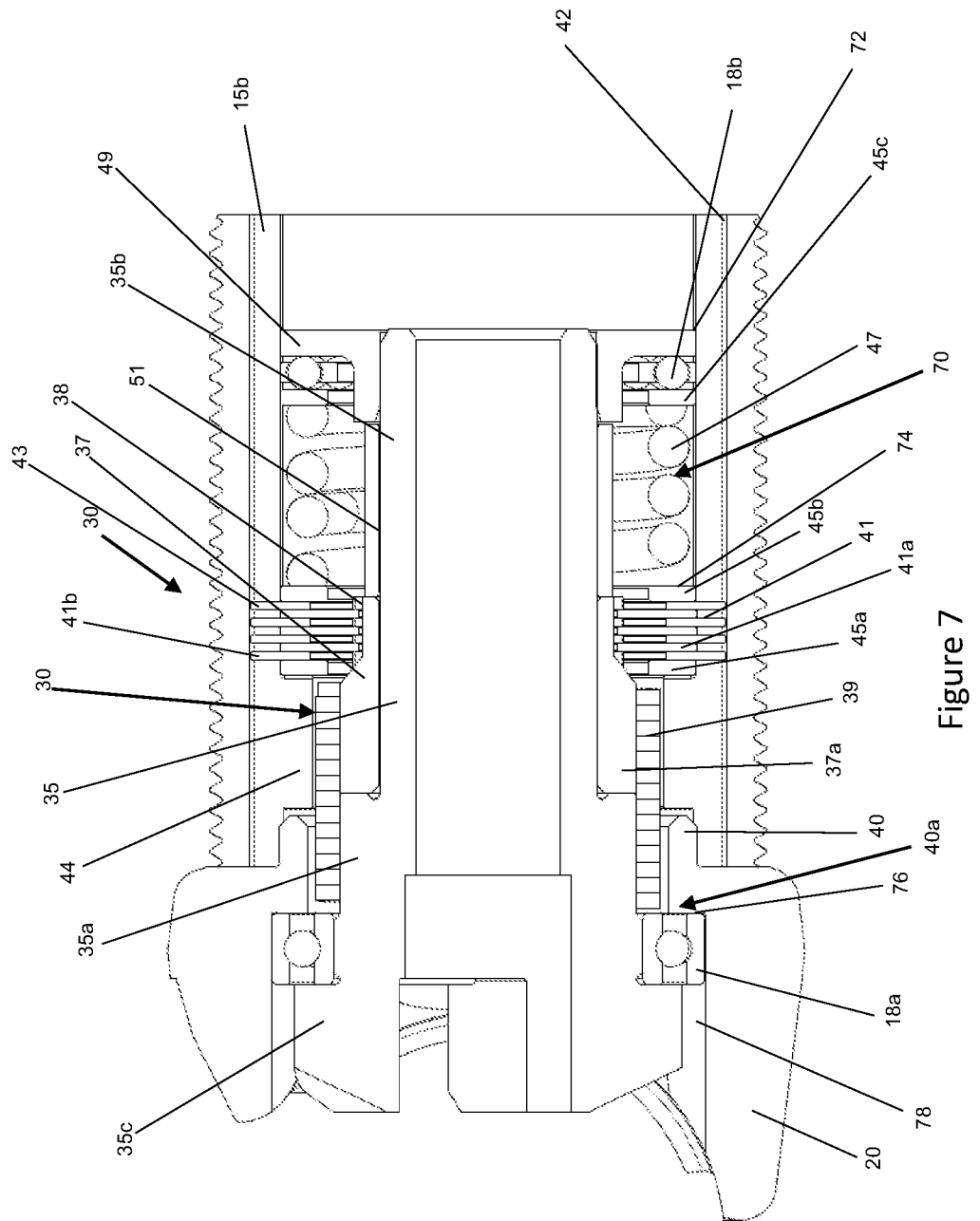
FIG. 7 is a cross-sectional view through an inboard-outboard horizontal plane of the actuator arrangement of a brake identical to FIG. 1, except with an alternative connection between the operating shaft and one-way clutch.

The friction clutch 41 comprises output plates 41b positioned between the input plates 41a (see FIG. 7). The output plates 41b of the clutch 41 have diametrically opposite radially outwardly facing lugs 43, which are not present on the input plates 41a. Alternatively a ball and ramp arrangement could be used instead of a friction clutch with input and output plates, as is known in the art.

A stop 44 projects radially inwardly from the inner piston 15b, radially outward of a circumferential shoulder portion 37a that projects radially outwardly from the driven drum 37. The shoulder portion 37a seats one end of the wrap spring 39. In the axial direction, the wrap spring 39 is retained by the drive drum collar 35a and a washer 45a, but does have some axial freedom of movement.

As can be seen most clearly from FIG. 7, the drive drum 35 is restrained from moving in an outboard direction, and allowed to rotate relative to the yoke 20, by a first rolling element bearing 18a. The bearing 18a is an interference fit with the through bore of the yoke 20 and the drive drum 35. In other words, an outer race of the bearing 18a is rotationally fixed to the yoke, and an inner race of the bearing 18a is rotationally fixed to the drive drum 35.

An inboard facing surface of the bearing 18a engages an outboard facing surface of a flange portion 35c at the inboard end of the drive drum 35. An outboard facing surface of the bearing 18a engages the annular inboard facing surface of the shoulder 40a of the sleeve portion 40 of the yoke 20. In this way, the drive drum 35 is restrained from moving axially outboard, once the brake is assembled.

In this embodiment, the bearing 18a is a deep-groove ball bearing, to help ensure that it will not fail under the axial loads that will be applied during operation of the brake. The bearing 18a also engages a radially outer surface of the collar 35a of the drive drum 35, to retain the drive drum 35 in a radial direction, and to accept radial loads passing through the drive drum 35. There is an axial clearance between the bearing 18a and the wrap spring 39. As well as helping enable smooth rotation of the drive drum 35 relative to the yoke 20, the bearing 18a also helps to locate the drive drum 35 radially, helping to prevent misalignment of the drive drum 35 within the adjustment mechanism, which can impair adjuster function during the life of the brake.

The piston 15 comprises an outer piston 15a having an internal female thread, and an inner portion or inner piston 15b, having a complimentary external male thread. Therefore, in this embodiment the inner piston 15b is located within the outer piston 15a. The inner piston 15b has at least one recess in its inner surface. In this embodiment, the recesses are two longitudinally extending channels 42 located diametrically opposite one another. When the adjuster mechanism 30 is assembled, the lugs 43 of the output plates 41b of the clutch 41 locate within the channels 42, to key the output plates 41b to the inner piston 15b. Therefore, rotation of the output plates 41b results in rotation of the inner piston 15b.

The components above, that are located between the operating shaft and inner and outer piston, define a transmission path of the wear adjuster mechanism 30.

When the adjuster mechanism 30 is assembled, the sleeve portion 40 of the yoke 20 is located concentrically between the wrap spring 39 and the inner piston 15b. The sleeve portion 40 is restrained from rotating, as it is integral with, or secured to, the yoke 20, which is also configured to be non-rotatable when assembled in the disc brake. However, the inner piston 15b is configured to rotate during an adjustment operation, to cause the piston 15 to advance in the direction of the inboard brake pad 11a. An outboard facing surface of the yoke 20 opposes and contacts an inboard facing end surface of the inner piston 15b. Friction between these two surfaces helps to inhibit undesired vibration-induced torque from affecting the adjustment mechanism in operation, and causing undesired de-adjustment of the disc brake. Advantageously, the friction provides a consistent friction torque but in a small space envelope.

The two opposing surfaces are preferably arranged to have sufficient friction to resist relative rotation of the yoke 20 and the inner portion 15b of the piston 15 with a torque greater than the torque required to cause the one-way clutch of the adjuster mechanism (in this case the wrap spring 39) to slip when the actuation force is released at the end of a braking operation. This helps to ensure that the one-way clutch slips rather than permits unwanted de-adjustment of the brake occurring during brake release. In this embodiment, the outboard facing surface of the yoke of the piston is hardened. In alternative embodiments, the inboard facing surface of the rotatable portion is hardened. It has been found that by hardening one of the two engaging surfaces, undesirable fretting corrosion can be significantly reduced.

The wear adjuster mechanism 30 comprises first, second and third washers 45a, 45b, 45c. The first washer 45a is located adjacent and inboard of the friction clutch 41, and engages the friction clutch, as well as an outboard facing surface of the stop 44. The second washer 45b is located adjacent and outboard of the friction clutch 41, and an inboard surface of the washer 45b engages the friction clutch. An outboard face of the second washer 45b is acted on by a resilient element in the form, in this embodiment, of a compression spring 47. The compression spring 47 is arranged concentrically within the inner piston 15b, between the second washer 45b and the third washer 45c. The compression spring 47 acts as a clutch spring to load the friction clutch 41, to generate the required amount of friction to control the torque at which the friction clutch 41 slips.

The compression spring 47 also controls the amount of friction between the outboard facing surface of the yoke and the inboard facing end surface of the inner piston 15b. A force transmission path is defined from the compression spring 47 to the inner piston 15b, to urge the inner piston 15b into axial engagement with the yoke 20, to resist relative rotation of the yoke 20 and the inner piston 15b. It will be appreciated that a spring is just one type of biasing element that could perform this function, and other biasing elements could also be used if desired.

The compression spring 47 is pre-stressed by a stop 49 or end cap. In this embodiment, the stop 49 is generally hat-shaped in cross-section, with a central bore so the stop 49 can be mounted on the projecting portion 35b of the drive drum 35. The stop 49 has a sleeve portion projecting in an axially inboard direction. A second rolling element bearing 18b is provided between a radially outer surface of the sleeve portion of the stop 49 and a radially inner surface of the inner piston 15b. In this embodiment the second rolling element bearing 18b is a thrust bearing that is arranged to isolate the compression spring 47 and output clutch plates 41b from the drive drum 35 in rotation. The stop 49 engages the third washer 45c via the thrust bearing to pre-stress the compression spring 47. A clearance exists between the cap and second bearing on the one hand, and the inner piston on the other.

In an alternative embodiment (not shown), the second rolling element bearing is a ball bearing with radially arranged inner and outer races, the inner of which may be an interference fit with the stop 49 or directly in the projecting portion 35b so it may act itself as the stop. The compression spring 47 is compressed by and supported directly or indirectly on the outer race and is therefore isolated from rotation of the projecting portion 35b, but applies a force to the projecting portion and drive drum 35 as a whole in an outboard direction as in the embodiment above.

In this embodiment, the second bearing 18b is a standard ball bearing, but in alternative embodiments the second bearing 18b could be identical to the first rolling element bearing 18a, for example by also being a deep-groove ball bearing, or an angular contact ball bearing.

In both embodiments, the arrangement of the second bearing 18b also further assists to ensure radial alignment in an angular sense (i.e., the drive drum, the yoke and the inner piston and inner piston remain co-axial) under eccentric loads from the operating shaft during an adjustment operation, and in particular during the return of the operating shaft and piston to their brakes-off rest positions. The axial load from the compression spring 47 (of the order of 600N) is transmitted to the projecting portion 35b, the drive drum 35 and then into the yoke 20 by the first bearing 18a. The compression spring also loads the inner piston 15b via the friction clutch 41 in the opposite direction. As such, even when the return springs 46 act on the yoke 20 and this in turn "pulls" the piston 15 back, the compression spring load maintains full face contact between the yoke and the inner piston 15b and with it the axial alignment of the components.

In this embodiment, the outboard surface of the stop 49 is flush with the outboard surface of the projecting portion 35b of the drive drum 35. This helps to ensure that the stop is mounted in the correct location during assembly of the adjustment mechanism. The stop 49 is mounted to the projecting portion 35b with an interference fit. It will be appreciated in other embodiments that the stop 49 could be mounted differently e.g., with circlips or the like.

Between an inboard facing surface of the sleeve portion of the stop 49 and an outboard facing surface of the driven drum 37 is an annular spacer element 51. The spacer element 51 is located on the projecting portion 35b of the drive drum 35. In this embodiment, the spacer element 51 has some play in the axial direction. In other words, an air gap is defined between the spacer element 51 and the drive drum 35 and/or the spacer element 51 and the sleeve portion of the stop 49.

In this embodiment, the outer piston portion 15a is integral (i.e., formed monolithically from the same material by casting, or forging, for example) with the spreader plate 60. The spreader plate 60 locates the inboard brake pad 11a, as well as engages surfaces of the carrier 4. Therefore, the interaction of the spreader plate 60 and carrier 4 prevent rotation of the outer piston 15a in use. In alternative embodiments, the spreader plate 60 is smaller and/or may be a separate component, and an alternative anti-rotation feature is provided within the brake.

In order to maintain a desired running clearance between the brake pads and rotor, the wear adjustment mechanism 30 is required to periodically advance the inboard brake pad 11a towards the rotor 10 to account for the loss of friction material 13, and to a lesser extent loss of material from the face of the rotor 10, due to wear.

A predetermined amount of play or backlash is provided in the system between the pin and slot of the operating shaft and driving portion of the adjustment mechanism, (or between teeth of a gear based driving arrangement, or between the lugs of the input plates 41a of the clutch and the recesses 38, in other arrangements not shown in the figures). In a normal braking operation in which the running clearance is within the desired parameters, as the operating shaft 21 pivots, the play in the system means that no adjustment will occur.

If the running clearance is however greater than the desired range, the aforesaid play is taken up. Whilst there is excess running clearance to be taken up, this rotation is transmitted via the drive drum 35 to the wrap spring 39, causing the wrap spring 39 to rotate around the drive drum 35 and driven drum 37 in a direction which causes the wrap spring 39 to tighten, transmitting the rotation from the drive drum 35 to the driven drum 37. More specifically, this rotation is transmitted as the wrap spring bridges the two components, i.e., a first end of the wrap spring 39 engages an outer surface of the drive drum 35 and a second end of the wrap spring 39 engages an outer surface of the driven drum 37. Rotation of the driven drum 37 causes rotation of the input plates 41a of the friction clutch 41, due to the interaction of the recesses 38 and the lugs of the input plates 41a. Rotation of the input plates 41a results in rotation of the output plates 41b, due to the friction between the input and output plates 41a, 41b. As the lugs 43 of the output plates 41b engage the channels 42 of the inner piston 15b, the inner piston 15b is also caused to rotate.

Since the outer piston 15a is restrained from rotation by the engagement of the spreader plate 60 and the carrier 4, this causes a lengthening of the piston 15 to reduce the running clearance. At the point at which the friction material 13 comes into full contact with the rotor 10, the torque passing through the adjustment mechanism will start to increase. When this torque increases to a level that is higher than the maximum torque value of the friction clutch 41, the friction clutch 41 slips and further extension of the outer piston 15a is prevented. Once the braking operation ceases, return springs 46 act to urge the operating shaft 21 back to its rest position. A corresponding retraction of the inner piston 15b is prevented since the wrap spring 39 relaxes and does not transmit a reverse rotation to the driven drum 37.

Preferably, the engagement between the inboard-facing surface of the inner piston 15b and the outboard-facing surface of the yoke is configured to resist relative rotation of the yoke 20 and inner piston 15b with a torque greater than the torque required to cause the one-way clutch (in this case the wrap spring 39) to slip, when the actuation force is released at the end of a braking operation. This helps to ensure that the wrap spring 39 slips rather than permitting unwanted de-adjustment of the brake occurring during brake release.

The co-axial mounting of the adjuster mechanism 30 within the piston 15 minimizes the space required by the mechanism within the housing, resulting in a lighter, more compact housing.

As the wrap spring 39 directly engages the outer surface of the drive drum 35 and the driven drum 37, any potential backlash that may occur between the drive drum 35 and the wrap spring 39, or the driven drum 37 and the wrap spring 39, is minimized, which can help to reduce wear of the components. Uncontrolled unwinding of the wrap spring 39 is also minimized, which provides a more predictable, and hence controllable, friction level. The wear on the outer surfaces of the drums 35, 37 is also minimized. The arrangement also helps to remove uncertainties that may arise after manufacturing of the components, for example unpredictable tolerances, which may affect the function of the system.

As described above, the components of the adjuster mechanism 30 are contained within the piston 15, i.e., a chamber 70 is defined concentrically within the inner piston 15b and the outer piston 15a, for locating the adjuster mechanism 30 (see FIG. 7).

This actuation mechanism arrangement enables a simple arrangement to be provided for substantially sealing the chamber 70. The chamber 70 is substantially fluid-tight, so as to hold oil, or other suitable lubricating fluid for lubrication of the adjuster mechanism.

At the outboard end, a sealing member can be provided at location 72, to act between the stop 49 and the radially inner surface of the inner piston 15b. Alternatively, a sealing member can be provided at location 74, to act between the washer 45b and the radially inner surface of the inner piston 15b.

This outboard sealing arrangement helps to ensure that lubricating fluid from the adjuster mechanism is inhibited in an outboard direction through the outboard end of the outer piston. The outboard sealing arrangement acts in combination with the spreader plate 60 and the outer piston 15a being integrally formed, which also helps to prevent loss of lubricating fluid from the chamber 70 in an outboard direction.

In some embodiments (not shown in the Figures), a manual rewind apparatus incorporating an elongate manual rewind shaft is provided, to rewind the piston 15 back to its retracted position when it is necessary for the brake pads to be replaced, for example. In one example of a manual rewind apparatus, a piston engaging end piece is mounted on the manual rewind shaft. The end piece can be generally circular in profile, but with two diametrically opposed projections. The end piece and the projections are dimensioned such that the projections locate within the longitudinally extending channels 42 of the inner piston 15*b*. The channels 42 allow the inner piston 15*b* to advance during a braking operation, whilst the shaft is axially fixed.

In use during manual adjustment, therefore, a user rotates the rewind shaft. Due to the engagement between the projections of the end piece and the channels 42 of the inner piston 15*b*, the inner piston 15*b* is caused to rotate, rewinding the piston 15 back to its original retracted position.

Preferably, the longitudinal channels 42 are arranged to be located away from the opposing 'twelve o'clock' and 'six o'clock' circumferential locations on the radially inner surface of the inner piston 15*b*, for example at 'three o'clock' and 'nine o'clock', when the brake is assembled on an axle of a vehicle. Advantageously, this helps to further inhabit passage of lubricant through the channels 42, which could occur under gravity through the most radially lower channel 42 (e.g., if a channel was at a 'six o'clock' position), when the brake is in a normal orientation.

The chamber 70 comprises an opening at its inboard end, and loss of lubricating fluid in an inboard direction through the opening can be inhibited by a further sealing arrangement located at the inboard end within, or immediately adjacent, the chamber 70. In this embodiment, a sealing member can be provided at location 76, between the outboard-facing surface of the bearing 18*a* and the inboard-facing surface of the shoulder 40*a* of the yoke 20. A sealing member can also be provided at location 78, between the radially outer surface of the collar 35*a* of the drive drum 35 and the radially inner surface of the yoke 20.

Therefore, in use, a 'bath' of lubricating fluid is retained within the chamber 70, i.e., substantially no lubricant can pass inboard of the inboard sealing arrangement through a potential fluid transmission path defined between the yoke 20 and the drive drum 35. Similarly, no substantially no lubricant can pass outboard of the outboard sealing arrangement through a potential fluid transmission path defined between the inner piston 15*b* and the adjuster mechanism 30. The adjuster mechanism can be at least partially submerged in the 'bath' of the lubricating fluid. This reduces wear of the components of the adjuster mechanism, extending the life of a disc brake comprising this adjuster system.

The sealing members are preferably elastomeric o-rings, but it will be appreciated that any suitable sealing members could be used with minor modifications to the sealing arrangement that would be within the remit of the skilled person, e.g., lip seals, u-cups, metal sealing discs, etc.

In alternative arrangements, the chamber 70 is not fluid-tight, but simply configured to contain lubricant for lubrication of at least part of the wear adjustment mechanism, and inhibit lubricant from migrating away from the wear adjustment mechanism. As the lubricant is inhibited from escaping from a defined location, it is restricted from migrating to other areas of the disc brake 2, reducing wear of the components of the adjustment mechanism, and extending the life of a disc brake 2 comprising this adjuster system. If the lubricant is grease or a lubricating oil, a higher quantity of lubricant can be maintained near the parts of the wear adjustment mechanism needing lubrication, such as the wrap spring and/or friction clutch plates. Thus, should there be a degradation or escape of the lubricant over time, a greater amount of lubricant will nevertheless remain in contact with the parts requiring lubrication.

One way to inhibit the lubricant is for the chamber and/or the wear adjustment mechanism to have a radial step arranged to define a barrier to inhibit the escape of lubricant in an inboard or outboard direction. For example, looking at FIG. 7, the stop 44 of the inner piston 15*b*, which projects radially inwardly could be dimensioned and arranged to inhibit any lubricant contained outboard of the stop 44 from escaping in an inboard direction past the stop 44. The washer 45*a* could also be dimensioned to extend radially to a sufficient extent to overlap and perform the same function, i.e., inhibit lubricant from escaping.

As a disc brake is mounted in a fixed orientation on a vehicle, provision of a radial step tends to inhibit the escape of at least a portion of lubricant under gravity and may help to create a more tortuous path out of the chamber for lubricant in the event of lubricant being dislodged by virtue of the disc brake being subjected to vibration, jolts or the like. The radial step may advantageously extend around a complete circumference, such that a barrier exists irrespective of the orientation of the disc brake on a vehicle.

The chamber and/or the wear adjustment mechanism may also have first and second opposed interface surfaces having a spacing sufficiently small therebetween so as to act a barrier to inhibit the escape of lubricant in an inboard or outboard direction. As an example, the washers 45*a*, 45*b* or 45*c* could be dimensioned to extend radially a sufficient extent to define only a small radial spacing between the two components, to inhibit lubricant from escaping. Alternatively, the sleeve portion 40 of the yoke 20 could extend further in the outboard direction, such that its radially inner surface opposes the radially outer surface of the shoulder portion 37*a* of the driven drum 37.

First and second opposed interface surfaces further improve the containment of lubricant within the chamber. The surfaces may be radially opposed or axially opposed. The spacing required may be larger for relatively viscous lubricants such as grease, and a closer fit for thinner.

The chamber 70 may be provided as a unitary item with the wear adjustment mechanism, such that removal of the adjustment mechanism from the caliper housing 6 of the disc brake 2 also results in removal of the chamber therefrom, for maintenance or replacement.

It will be appreciated that numerous changes may be made within the scope of the present invention. For example, certain aspects of the invention may be applicable to other types of brake, such as twin piston or electromechanically actuated brakes.

Figure 8:
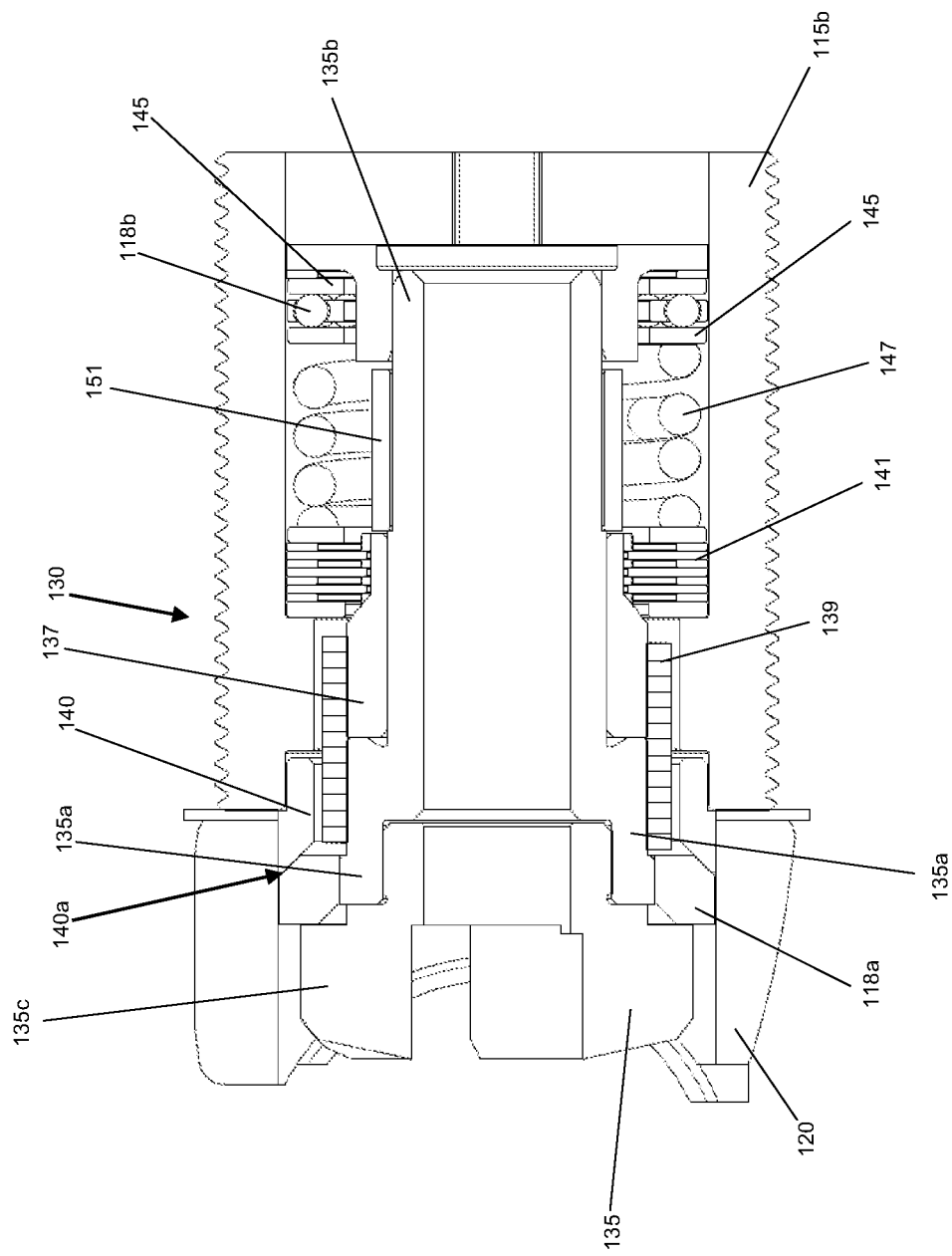
FIG. 8 is a cross-sectional view through an inboard-outboard horizontal plane of an alternative adjuster arrangement to the one shown in the brake of FIG. 1.

In alternative embodiments, a different type of bearing arrangement could be utilized at the inboard end of the adjustment mechanism. For example, see FIG. 8 where an alternative arrangement is illustrated, with like reference numbers indicating like features, but with the prefix '1'.

In this alternative arrangement, the drive drum 135 is restrained from moving in an outboard direction, and allowed to rotate relative to the yoke 120, by a first rolling element bearing 118*a*. The first bearing 118*a* is an angular contact ball bearing. In this embodiment, an inner chamfer is arranged between a radially inner facing surface of the first bearing 118*a* and an inboard facing surface of the first bearing 118*a*. An outer chamfer is arranged between a radially outer facing surface of the first bearing 118*a* and an outboard facing surface of the first bearing 118*a*.

The inboard facing surface of the bearing 118*a* engages an outboard facing surface of a flange portion 135*c* at the inboard end of the drive drum 135. A surface inclined to the longitudinal axis of the drive drum 135 is defined by the outer chamfer of the first bearing 118*a* and engages a corresponding inclined surface of the shoulder 140*a* of the sleeve portion 140 of the yoke 120. In this way, the drive drum 35 is restrained from moving axially outboard, once the brake is assembled. As the first bearing 118*a* is an angular contact ball bearing, it will perform well under the axial loads that will be applied during operation of the brake. The first bearing 118a also engages a radially outer surface of the collar 135a of the drive drum 135, to retain the drive drum 135 in a radial direction, and to accept radial loads passing through the drive drum 135. There is an axial clearance between the first bearing 118a and the wrap spring 139. As well as helping enable smooth rotation of the drive drum 135 relative to the yoke 120, the first bearing 118a also helps to locate the drive drum 135 radially, helping to prevent misalignment of the drive drum 135 within the adjustment mechanism, which can impair adjuster function during the life of the brake.

Figure 9:
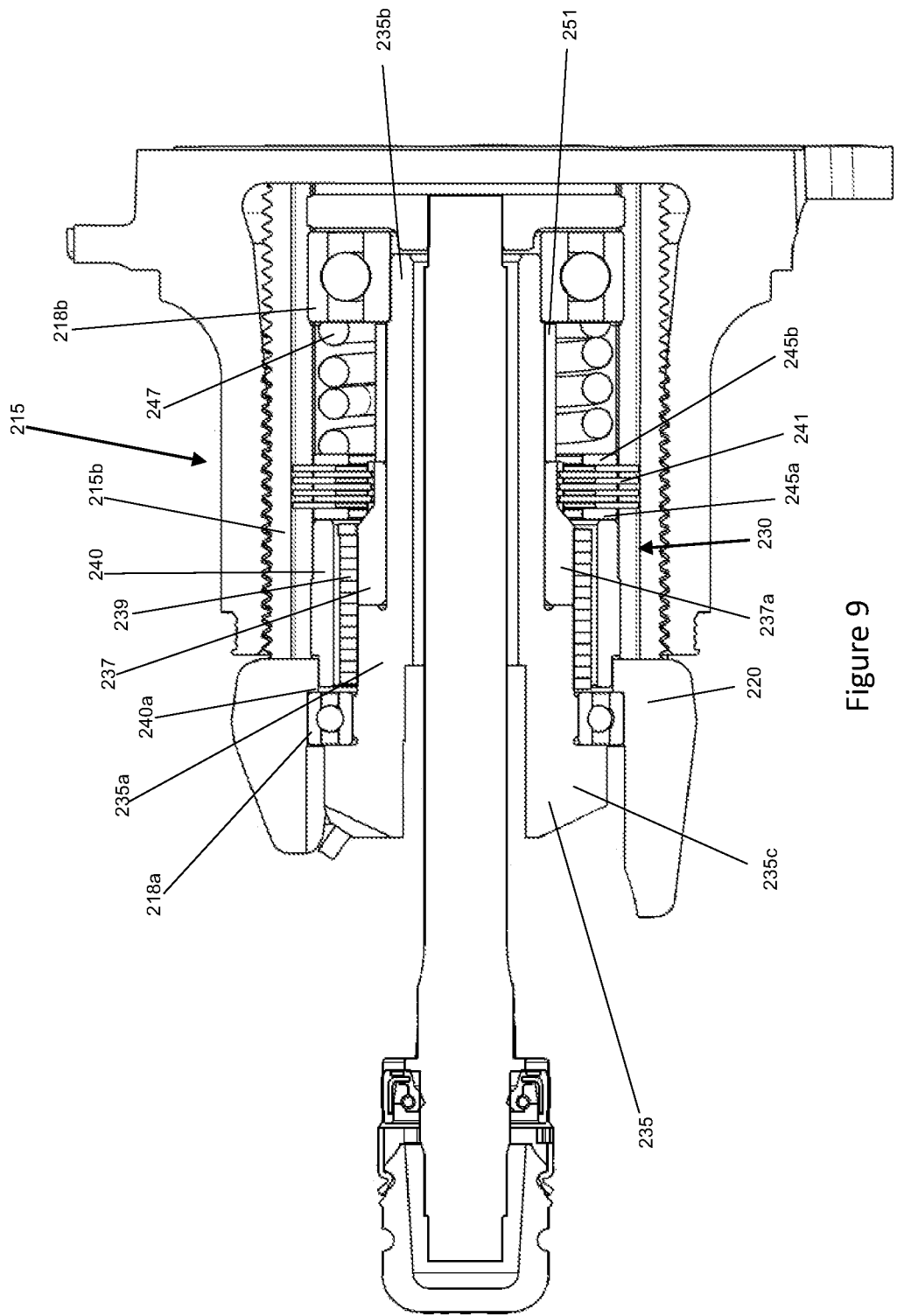
FIG. 9 is a cross-sectional view through an inboard-outboard horizontal plane of a further alternative adjuster arrangement to the one shown in the brake of FIG. 1.

FIG. 9 shows a further alternative arrangement, with like reference numbers indicating like features, but with the prefix '2'. In this embodiment, the sleeve portion 240 and yoke 220 are separate components that are not fixed together during assembly. Instead, in this embodiment, the sleeve portion 240 has an interference fit with the inner piston 215b. However, it will be understood that the sleeve portion 240 and inner piston 215b could be fixed together with any suitable arrangement that is within the knowledge of a person skilled in this field.

The sleeve portion 240 has a reduced diameter portion at its inboard send that fits within the bore of the yoke 220. The sleeve portion 240 can rotate relative to the yoke 220. The diameter of the bore of the yoke at the sleeve portion 240 is lower than the diameter of bore for the remainder of the yoke, such that an internal shoulder 240a is defined between the sleeve portion 240 and the remainder of the yoke 220.

In this embodiment, there is no stop projecting radially inwardly from the inner piston 215b. Instead, the sleeve portion 240 projects axially outboard to a greater extent than the sleeve portion 40 of FIG. 7, such that it acts as a stop. The sleeve portion 240 is radially outward of the circumferential shoulder portion 237a that projects radially outwardly from the driven drum 237 and seats one end of the wrap spring 239. In the axial direction, the wrap spring 239 is retained between the drive drum collar 235a and a washer 245a, but does have some axial freedom of movement. There is again an axial clearance between the bearing 218a and the wrap spring 239.

When the adjuster mechanism 230 is assembled, the sleeve portion 240 is located concentrically between the wrap spring 239 and the inner piston 215b. The sleeve portion 240 rotates with the inner piston 215b because of the interference fit. The inner piston 215b is configured to rotate during an adjustment operation, to cause the piston 215 to advance. An outboard facing surface of the yoke 220 opposes and contacts an inboard facing surface of the inner piston 215b. Friction between these two surfaces helps to inhibit undesired vibration-induced torque from affecting the adjustment mechanism in operation, and causing undesired de-adjustment of the disc brake. Advantageously, the friction provides a consistent friction torque but in a small space envelope.

The two opposing surfaces are arranged to have sufficient friction to resist relative rotation of the yoke 220 and the inner portion 215b of the piston 215 with a torque greater than the torque required to cause the one-way clutch of the adjuster mechanism (in this case the wrap spring 239) to slip when the actuation force is released at the end of a braking operation. This helps to ensure that the one-way clutch slips rather than permits unwanted de-adjustment of the brake occurring during brake release. In this embodiment, the radially outward facing surface of the sleeve is hardened. In alternative embodiments, the radially inward facing surface of the rotatable portion is hardened. It has been found that by hardening one of the two engaging surfaces, undesirable fretting corrosion can be significantly reduced.

The wear adjuster mechanism 230 comprises first and second washers 245a, 245b. The first washer 245a is located adjacent and inboard of the friction clutch 241, and engages the friction clutch, as well as an outboard facing surface of the sleeve portion 240. The second washer 245b is located adjacent and outboard of the friction clutch 241, and an inboard surface of the washer 245b engages the friction clutch 241. An outboard face of the second washer 245b is acted on by the compression spring 247. The compression spring 247 is, in this embodiment, arranged concentrically within the inner piston 215b, between the second washer 245b and the second bearing 218b to load the friction clutch 241.

The compression spring 247 is pre-stressed by the second bearing 218b. The second rolling element bearing 218b is provided between a radially outer surface of the projecting portion 235b of the drive drum 235 and a radially inner surface of the inner piston 215b. In this embodiment the second rolling element bearing 218b is identical to the first rolling element bearing 218a, also being a deep-groove ball bearing, but is larger as it must cope with a larger load than the first bearing 218a. The bearing 218b has radially arranged inner and outer races. The bearing 218b is axially fixed relative to the projecting portion 235b. The bearing 218b can slide relative to the inner piston 215b. In this embodiment, the bearing 218b is axially fixed relative to the projecting portion 235b by the inner race being an interference fit with the projecting portion 235b. The compression spring 247 is compressed by and supported directly on the outer race and is therefore isolated from rotation of the projecting portion 235b, but applies a force to the drive drum 235 as a whole in an outboard direction because of the interference fit between the second bearing 218b and the projecting portion 235b of the drive drum 235. There is also a load path from the compression spring 237 through the first washer 245a to the sleeve portion 240 to urge the sleeve portion 240 in the inboard direction. Due to the interference fit between the sleeve portion 240 and the inner piston 215b, the inner piston 215b is also urged in the inboard direction, towards the yoke 220. This helps to control the friction between the opposing surfaces of the yoke 220 and inner piston 215b and resist relative rotation of the two components, without the need for an inner piston stop, as required in previous embodiments. The axial location of the second bearing 218b is carefully controlled during assembly to apply an appropriate pre-load to the compression spring 247.

The arrangement of the second bearing 218b also further assists with radial alignment in an angular sense (i.e., the drive drum, the yoke and the inner piston and inner piston remain co-axial) under eccentric loads from the operating shaft during an adjustment operation, and in particular during the return of the operating shaft and piston to their brakes-off rest positions. The axial load from the compression spring 247 (of the order of 600N) is transmitted to the drive drum 235 and then into the yoke 220 by the first bearing 218a.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An actuation mechanism for a disc brake, the actuation mechanism comprising:
    a non-rotatable yoke to transmit an actuating force from an operating shaft;
    a piston configured to be driven by the yoke to transmit the actuating force to a brake pad, the piston including a rotatable portion that is rotatable with respect to the yoke to cause the piston to extend;
    a wear adjustment mechanism for adjusting extension of the piston to account for wear of the brake pad, the wear adjustment mechanism including a driving portion configured to be driven by the operating shaft to transfer torque from the operating shaft to the rotatable portion of the piston to cause the rotatable portion to rotate and extend the piston, wherein the driving portion is a drive drum that is directly engaged by a link member that is connected to, or integral with, the operating shaft; and
    a rolling element bearing located between the drive drum of the wear adjustment mechanism and the yoke, wherein an outer race of the rolling element bearing is rotationally fixed to the yoke, and an inner race of the rolling element bearing is rotationally fixed to the drive drum.

2. The actuation mechanism of claim 1 wherein the yoke comprises a generally inboard facing surface that opposes a generally outboard facing surface of the driving portion to define an annulus that locates the rolling element bearing.

3. The actuation mechanism of claim 1 wherein the rolling element bearing is a deep-groove ball bearing.

4. The actuation mechanism of claim 1 wherein the yoke comprises an inclined surface and the rolling element bearing is an angular contact ball bearing with a corresponding inclined surface that engages the inclined surface of the yoke.

5. The actuation mechanism of claim 1 wherein an inboard facing surface of the rotatable portion of the piston engages an opposing outboard facing surface of the yoke such that friction is created between the inboard facing surface of the rotatable portion of the piston and the opposing outboard facing surface of the yoke to resist relative rotation of the yoke and the rotatable portion of the piston.

6. The actuation mechanism of claim 5 wherein a resilient element is arranged to provide a load acting to urge the outboard facing surface of the yoke and inboard facing surface of the piston into contact.

7. The actuation mechanism of claim 6 wherein the driving portion is part of a one-way clutch, the one-way clutch further comprising a driven portion.

8. The actuation mechanism of claim 7 wherein rotation of the yoke in relation to the rotatable portion of the piston is frictionally resisted with a torque greater than a torque required to cause the one-way clutch to slip, when the actuating force is released at an end of a braking operation.

9. The actuation mechanism of claim 7 wherein one of the driven or driving portions of the one-way clutch comprises an axially extending projecting portion.

10. The actuation mechanism of claim 9 wherein the other of the driven or driving portions is rotatably mounted with respect to the axially extending projecting portion.

11. The actuation mechanism of claim 9 wherein the resilient element is arranged to apply a load to the axially extending projecting portion, the load being transmitted to the yoke via the rolling element bearing.

12. The actuation mechanism of claim 11 wherein the resilient element is further arranged to apply a load to a torque limiting clutch of the wear adjustment mechanism.

13. The actuation mechanism of claim 12 wherein the resilient element is further arranged to apply a load to the piston in an opposite direction to the load on the yoke.

14. The actuation mechanism of claim 13 wherein the wear adjustment mechanism further comprises a second rolling element bearing mounted at an outboard end of the axially extending projecting portion to take the load from the resilient element.

15. The actuation mechanism of claim 14 wherein an axial location of the second rolling element bearing determines an amount of load applied by the resilient element.

16. The actuation mechanism of claim 14 wherein the second rolling element bearing is axially fixed relative to the axially extending projecting portion and located on a force transmission path between the resilient element and the axially extending projecting portion.

17. The actuation mechanism of claim 16 wherein the first and second rolling element bearings are substantially identical.

18. A method of assembling a disc brake comprising the steps of:
    installing an actuation mechanism within the disc brake, the actuation mechanism comprising:
        a non-rotatable yoke to transmit an actuating force from an operating shaft;
        a piston configured to be driven by the yoke to transmit the actuating force to a brake pad, the piston including a rotatable portion that is rotatable with respect to the yoke to cause the piston to extend; and
        a wear adjustment mechanism for adjusting extension of the piston to account for wear of the brake pad, the wear adjustment mechanism including a driving portion configured to be driven by the operating shaft to transfer force from the operating shaft to the rotatable portion of the piston to cause the rotatable portion to rotate and extend the piston, wherein the driving portion is a drive drum that is directly engaged by a link member that is connected to, or integral with, the operating shaft; and
    locating a rolling element bearing between the drive drum of the wear adjustment mechanism and the yoke, wherein an outer race of the rolling element is rotationally fixed to the yoke, and an inner race of the rolling element bearing is rotationally fixed to the drive drum.

19. A disc brake comprising:
    an actuation mechanism that includes:
        a non-rotatable yoke to transmit an actuating force from an operating shaft;
        a piston configured to be driven by the yoke to transmit the actuating force to a brake pad, the piston including a rotatable portion that is rotatable with respect to the yoke to cause the piston to extend; and
        a wear adjustment mechanism for adjusting extension of the piston to account for wear of the brake pad, the wear adjustment mechanism including a driving portion configured to be driven by the operating shaft to transfer torque from the operating shaft to the rotatable portion of the piston to cause the rotatable portion to rotate and extend the piston, wherein the driving portion is a drive drum that is directly engaged by a link member that is connected to, or integral with, the operating shaft; and
        a rolling element bearing is located between the drive drum of the wear adjustment mechanism and the yoke, wherein an outer race of the rolling element bearing is rotationally fixed to the yoke, and an inner race of the rolling element bearing is rotationally fixed to the drive drum.

\* \* \* \* \*

UNITED STATES PATENT AND TRADEMARK OFFICE
CERTIFICATE OF CORRECTION

| | |
|---|---|
| PATENT NO. | : 11,261,928 B2 |
| APPLICATION NO. | : 16/376012 |
| DATED | : March 1, 2022 |
| INVENTOR(S) | : Martin Taylor et al. |

It is certified that error appears in the above-identified patent and that said Letters Patent is hereby corrected as shown below:

In the Claims

Column 18, Line 43, Claim 18:
After "wherein an outer race of the rolling element"
Insert --bearing--.

Signed and Sealed this
Thirty-first Day of January, 2023

Katherine Kelly Vidal
*Director of the United States Patent and Trademark Office*